United States Patent
Gounares et al.

(10) Patent No.: US 6,681,370 B2
(45) Date of Patent: *Jan. 20, 2004

(54) HTML/XML TREE SYNCHRONIZATION

(75) Inventors: Alexander G. Gounares, Kirkland, WA (US); Christopher M. Franklin, Medina, WA (US); Thomas R. Lawrence, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/314,320

(22) Filed: May 19, 1999

(65) Prior Publication Data

US 2003/0028561 A1 Feb. 6, 2003

(51) Int. Cl.[7] .............................. G06F 3/14; G06F 17/30
(52) U.S. Cl. ......................... 715/513; 715/514; 707/201
(58) Field of Search ................................. 707/513, 514, 707/201; 345/853, 854; 715/513, 514

(56) References Cited

U.S. PATENT DOCUMENTS

| | | | | |
|---|---|---|---|---|
| 5,706,509 A | * | 1/1998 | Man-Hak Tso | 707/201 |
| 5,893,125 A | * | 4/1999 | Shostak | 707/511 |
| 6,003,043 A | * | 12/1999 | Hatakeyama et al. | 707/102 |
| 6,067,541 A | * | 5/2000 | Raju et al. | 707/201 |
| 6,085,161 A | * | 7/2000 | MacKenty et al. | 704/258 |
| 6,147,687 A | * | 11/2000 | Wanderski | 345/853 |
| 6,226,650 B1 | * | 5/2001 | Mahajan et al. | 707/201 |
| 6,237,006 B1 | * | 5/2001 | Weinberg et al. | 345/419 |
| 6,240,409 B1 | * | 5/2001 | Aiken | 707/4 |
| 6,289,357 B1 | * | 9/2001 | Parker | 707/202 |

OTHER PUBLICATIONS

World Wide Web Consortium, Extensible Markup Language (XML) 1.0, W3C Recommendation, Feb. 10, 1998, Sections 1 and 1.1.*

* cited by examiner

Primary Examiner—Sanjiv Shah
(74) Attorney, Agent, or Firm—Lee & Hayes, PLLC

(57) ABSTRACT

The HTML/XML tree synchronization module synchronizes a document with a view or multiple views, after a change has been made to the document. First, the tree synchronization module receives a document change from an application program. An update processor converts the tree data of the document to a character string, and receives document change information from one or more application program interfaces. The update processor utilizes the document change information to update the document tree data character string. The document change information is then sent to one or more application program interfaces to determine the scope and content of the document views. A log generator receives the view change information, and creates record logs for each changed document view. These logs are played by a log player to each view, and each view data tree is updated with the view changes contained in the change logs. The tree synchronization module sends the subsequent view changes to the application program to update the display views.

27 Claims, 10 Drawing Sheets

HTML/XML TREE SYNCHRONIZATION

TECHNICAL FIELD

The present invention relates generally to computer systems, and relates more specifically to synchronizing a document with its display screen view or multiple display screen views of the same document after a user has made changes to the document content.

BACKGROUND OF INVENTION

The World Wide Web and the Internet present opportunities to design and display webpages and other Internet viewable documents. Markup languages, such as HyperText Markup Language (HTML) and Extensible Markup Language (XML), are among several programming languages used to design webpages and Internet viewable documents. These languages are different from previously used programming languages, in that markup languages permit the user to describe the structural and formatting content of a text document with the informational content of the same document. When a user writes a webpage or an Internet viewable document, the user inserts markup language "tags" into the informational content of the text document, defining the structure and formatting of the text in the document to be viewed by the user. The computer hardware interprets these "tags" contained in the informational content of the document as formatting and structural instructions for the document. Thus, a user programming in a markup language writes an instructional set of formatting and structural commands directly into the text of the document. When complete, the markup language document is stored in an internal or external memory device for repeated use by the user.

Generally, application programs are pre-programmed sets of instructions that utilize documents and other files stored in memory. A user can make changes to documents and other files using application programs being run on a computer. For example, Microsoft OFFICE is an application program designed to view HTML and XML text documents. When a user views an HTML or XML document using Microsoft OFFICE, the document is displayed by Microsoft OFFICE on a monitor display screen connected to a computer. The user can then input changes to the HTML or XML document through a keyboard or mouse attached to the computer running the application program.

Documents written in HTML and XML can be a composition of several "chunks," with each chunk being a separate HTML or XML document. Interesting subsections of HTML or XML code, otherwise known as "factoids," may be embedded within the chunks, and may be included in any location within a chunk. Thus, users may create new documents using a combination of chunks and factoids from other documents.

HTML or XML document content may be expressed in a range of different formats and fonts depending upon the markup language used. Even though the user changes the document format or font, the document text content remains the same. A user may also want to change the informational content of the document. The user could add a variety of information to the document including chunks and factoids, text, tables, picture or graphics files, sound files, or any other Internet-usable files.

Whenever the user changes the document format, font expression, or informational content of a document, the user creates a document "view" containing the user change. For example, a user may change the text font of a HTML document from a plain style font to an italicized boldface style font. The user creates a "view" of the original document text content containing the original document content in an italicized boldface style font. Multiple views of the original document text content can be created by the user if additional user changes are made to the original document.

Making changes to a HTML or XML document and applying the changes to a single view or multiple views of the same document can be a difficult and cumbersome process. Multiple views of the same document can be displayed on a single monitor display screen. When the user makes changes to the document, each display screen view of the document must be changed, or the user may be confused by different and inconsistent screen views of the same document content. Typically, the HTML or XML document is stored as a tree-type data structure. For example, when the markup code for a HTML or XML program is stored into a memory device, the HTML or XML code is parsed and stored as a "tree"-type data structure for access by the computer hardware.

Furthermore, the management and synchronization of the chunks and factoids within a single HTML or XML document can be a cumbersome process when each chunk and factoid must be stored within a tree-type data structure. Changes made to document chunks cannot be efficiently moved into the display screen view in all instances. The simplest method for updating screen views copies subsections of HTML or XML code stored in the document data tree to all of the screen views. However, this method is slow and cumbersome. In some cases, the application program has difficulties in identifying the changed subsections of the tree-type data structure.

Another method for updating screen views generates fine-grained notifications from a tree/rendering engine concerning the tree-type data structure changes. The notifications are played back to an application program, and the application program listens to the changes and copies the changes to the screen views. However, reading these changes and copying the changes into the screen views is expensive and requires code modifications to the tree/rendering engine. Problems arise with elements not actually in the tree-type data structure for periods of time, such as elements in a move or copy operation.

Yet another method for updating screen views uses a tree/rendering engine to synchronize the views based upon low level changes to the tree-type data structure. However, this method requires major code modifications in the tree/rendering engine resulting in a very fragile code prone to interruptions. Further problems arise with elements not actually in the tree structure for periods of time, such as elements in a move or copy operation.

Thus, representing a document in a tree-type data structure has a number of shortcomings, including (1) the difficulty of consistently determining and describing the precise location of data and the changes made within the tree structure; and (2) the expensive processing time of updating multiple document views by reference to the tree-type data structure when changes are made to the document.

SUMMARY OF THE INVENTION

The present invention relates to changing single or multiple views of a HTML/XML document when changes have been made to the document. A tree synchronization module synchronizes the updating of one or more document views when changes are made to the original document.

The present invention provides a consistent and repeatable method for describing the changes made to a document stored in a tree data structure. Documents composed in markup languages including, but not limited to, HTML, XML, and other similar codes may be stored in tree data structures. The changes to tree data structures can be easily recorded and applied to document views. For example, by representing locations within a tree data structure as a consistent and repeatable string of characters, the location of each character in a string is unique and is not based upon any reference to a physical memory structure. References to physical memory structure are used by the prior technology to represent locations in the tree data structure. Identification of these locations is not repeatable when the power is shut off and the locations of the physical memory structure are reset. If a change is made to a document and the change is represented by references to the physical memory structure, then the changes will not be represented in a consistent and repeatable manner if the references to the physical memory structure are changed.

Further, the present invention increases synchronization performance by avoiding excessive processing time used by the prior technology. The prior technology updated the document views by copying subsections of data from the tree data structure of the document to all of the views. Copying the data from the tree data structure to each view is very slow. By utilizing an asynchronous routine, changes recorded in the change logs can be applied to the views during downtime or at any other time processing time is not expensive, without diminishing processing performance.

Generally described, the invention includes a tree synchronization module with two components, a tree synchronization utility program and a tree synchronization engine. The tree synchronization utility program also includes two sub-components, an active data instance and active view instances. The active data instance is configured to receive document changes from a client program or an application program, such as Microsoft OFFICE, and to update the document tree data structures with the received document changes. Once the document tree data has been updated, the active data instance sends the document changes to the tree synchronization engine to generate change logs for each changed view based upon the document changes. The change logs are played to the active view instances configured for updating the view tree data. After the view tree data has been updated, the active view instances sends the view changes to the client program to update the display views.

More specifically, the invention provides a tree synchronization module configured for synchronizing changes to HTML/XML documents with their document views. The tree synchronization module receives changes to a HTML/XML document from an application program, such as Microsoft OFFICE. The active data instance in the tree synchronization utility program receives the document changes using a previously stored set of instructions contained in one or more application program interfaces (APIs). An update processor represents the tree data structure of a document as a flat string of characters, in which every beginning and end point of the tree is represented by a single character. Each character in the string uniquely identifies and describes a point in the tree. When the update processor receives the document changes processed from the stored instructions of the APIs, the update processor can update the document tree data structure with the document changes, and determine the location for the document changes based upon the unique locations of the data within the document character string.

After the document tree data structure has been updated, the document changes are sent to a tree synchronization engine. One or more APIs receive the document changes, and provide a log generator with the document change locations and the data change content. The log generator generates a change log record for each changed document view by recording each document change in terms of the character position within the document character string, and in terms of the content of changes made in the document. Changes in the document can affect multiple document views, thus generating multiple change logs.

Upon the detection of a trigger event by the tree synchronization engine, a log player then plays each change log to the active view instances of the tree synchronization utility program. One or more APIs receive the change logs, and the APIs send the view changes to the active view instances. The active view instances apply the change logs to their respective view tree data to synchronize the document view with the changes made in the document. When the view tree data has been updated, the updated view changes are then sent by the active view instances to the OFFICE application program to update the display views for the user.

Other objects, features, and advantages of the present invention will become apparent upon reading the following specification, when taken in conjunction with the drawings and the appended claims.

DETAILED DESCRIPTION OF INVENTION EMBODIMENTS

The invention may be embodied in a tree synchronization software module that implements a tree synchronization routine for a document and any number of document views. As an object-oriented program, the tree synchronization module exposes a standard interface that client programs may access to communicate with the tree synchronization module. The object-oriented architecture permits a number of different client programs, such as word processing program, a desktop publishing program, a program for creating Internet viewable documents, application programs, and so forth, to use the tree synchronization module. For example, the tree synchronization module can be used with an application program such as Microsoft OFFICE.

The interface exposed by the tree synchronization module allows the module to receive document changes from the client program. The tree synchronization module then makes changes to the document tree data structure, and synchronizes any view tree data structures with the document tree data structure according to the user changes to the document.

The tree synchronization module may be configured in three components, the active data instance, the tree synchronization engine, and one or more active view instances. A selected one of the active data instances receives the changes made to the document, updates the document tree data, interacts with the client program, and calls the tree synchronization engine as necessary. The tree synchronization engine interacts with the active data instances to receive the document changes, generates change logs or record logs according to changes made to the views, and plays the change logs or record logs to the other active view instances. These active view instances receive the played change logs or record logs from the tree synchronization engine, apply the change logs or record logs to the view tree data structures, update the display screen views, and call the client program as necessary.

Exemplary Operating Environment

Figure 1:
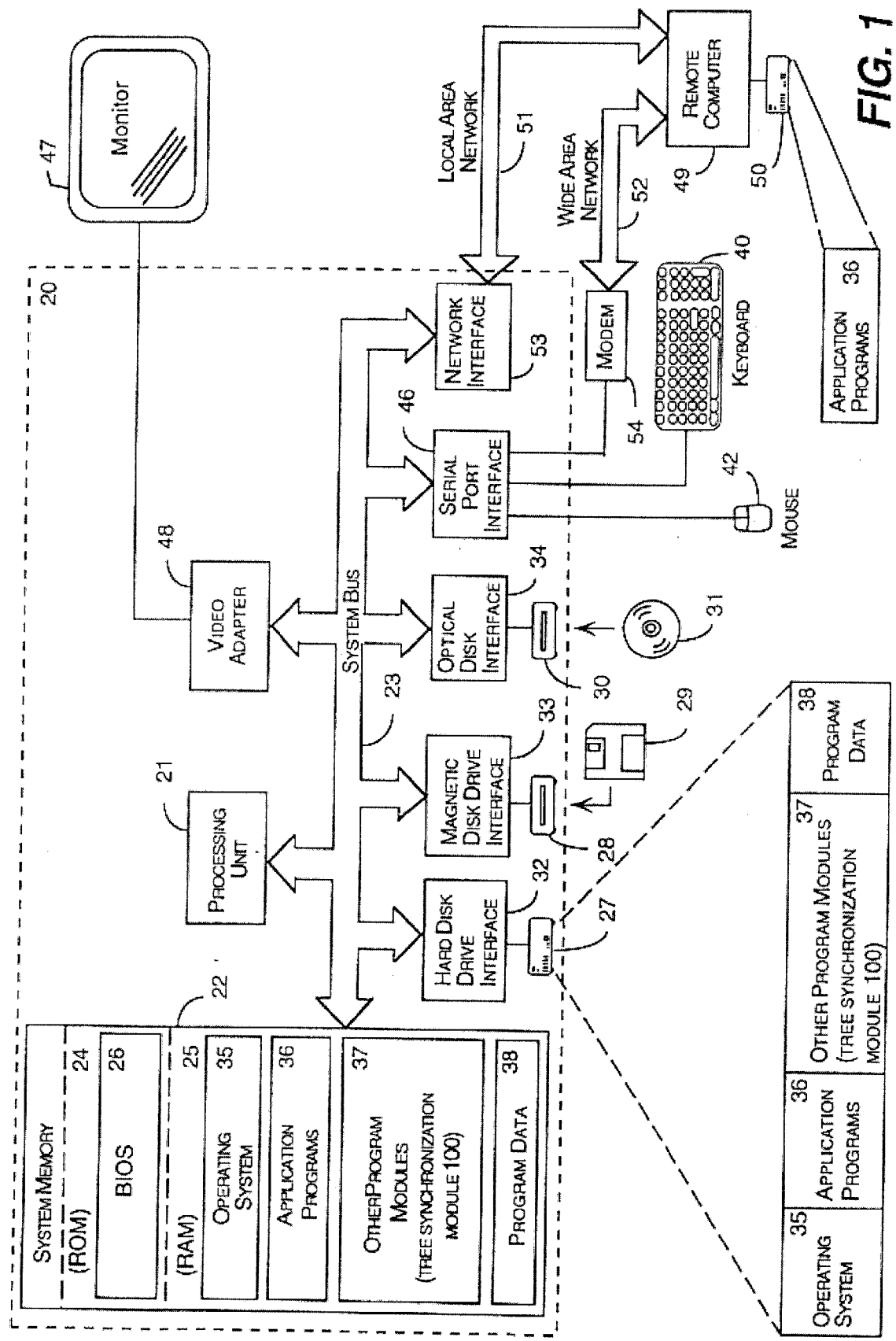
FIG. 1 is an illustration of an illustrative operating environment for embodiments of the invention.

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, program data 38, and the tree synchronization module 100 (the present invention). A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the invention are utilized by OFFICE application programs sold by Microsoft Corporation on CD-ROM for use with personal computer systems, such as the illustrative personal computer 20. The invention may be deployed with, or in connection with other programs that store or retrieve HTML, XML, or other Internet-viewable documents as tree-type data structures. It will be appreciated that the principles of the invention are not limited to desktop publishing software programs, but could equivalently applied to any computer-implemented system that involves the use of HTML or XML documents and views, or any other Internet-viewable documents stored in data tree structures.

For example, the invention may be implemented with a Microsoft OFFICE application program that stores HTML or XML document files and their respective views as tree-type data structures. In this case, the invention receives the document changes, applies the document changes to the document tree data structure, generates change logs or record logs for each respective view instance affected by the document changes, plays the change logs or record logs to each respective view tree data structure, applies the change logs or record logs to each view tree data structure, and updates each display screen view.

The Tree Synchronization Module

Figure 2A:
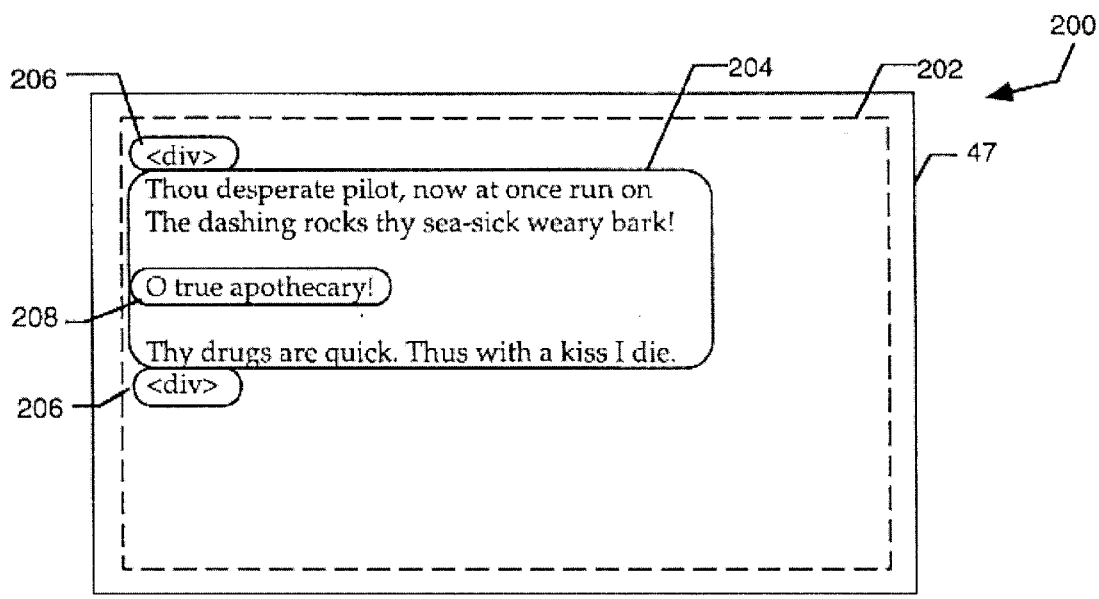
FIG. 2a is an illustration of a document screen prior to a user change to the document.
Figure 2B:
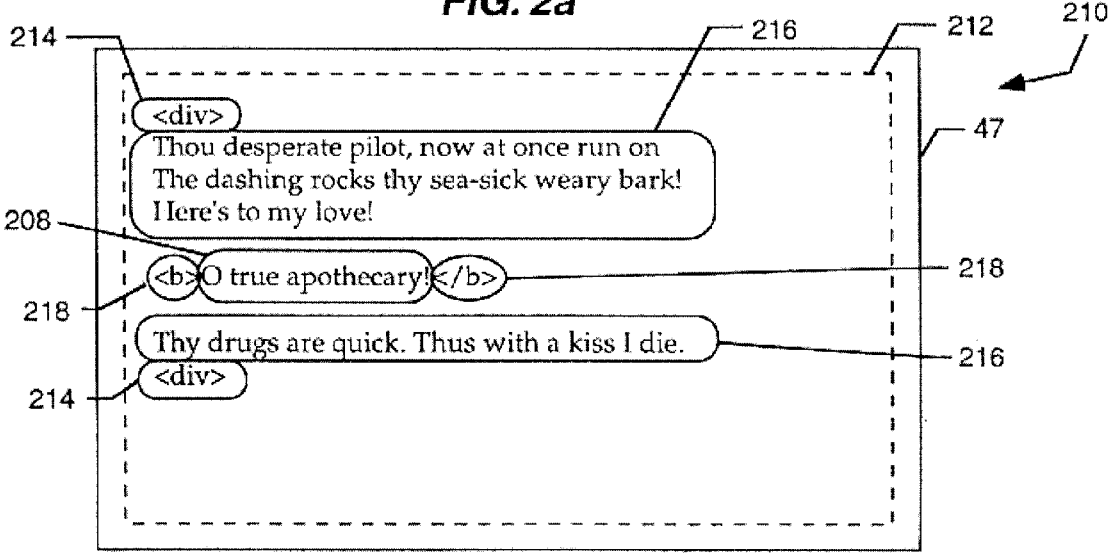
FIG. 2b is an illustration of a document view screen after a user change to the document.
Figure 3A:
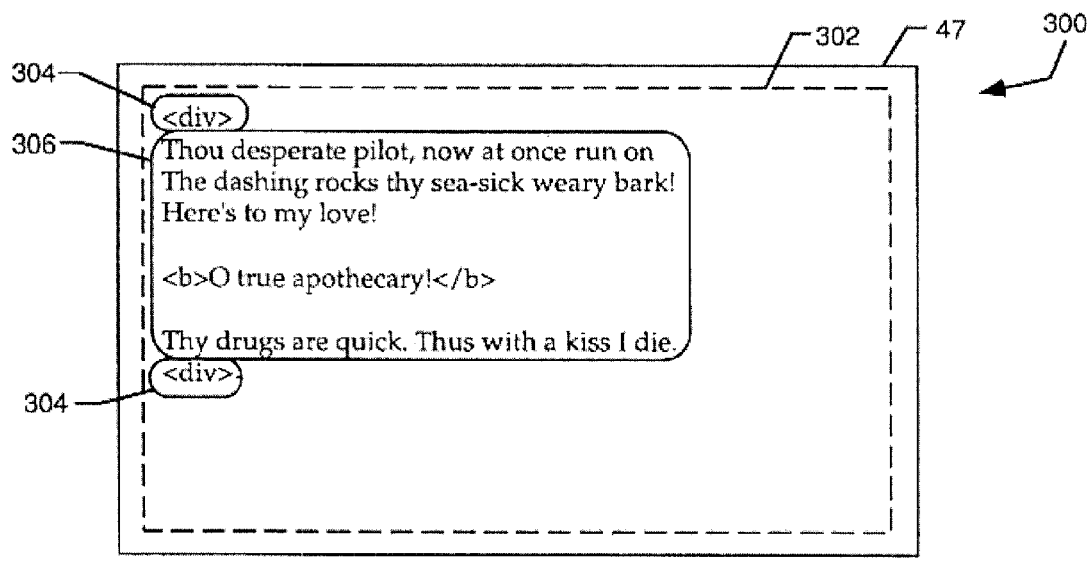
FIG. 3a is an illustration of a document screen prior to a user change to the document.
Figure 3B:
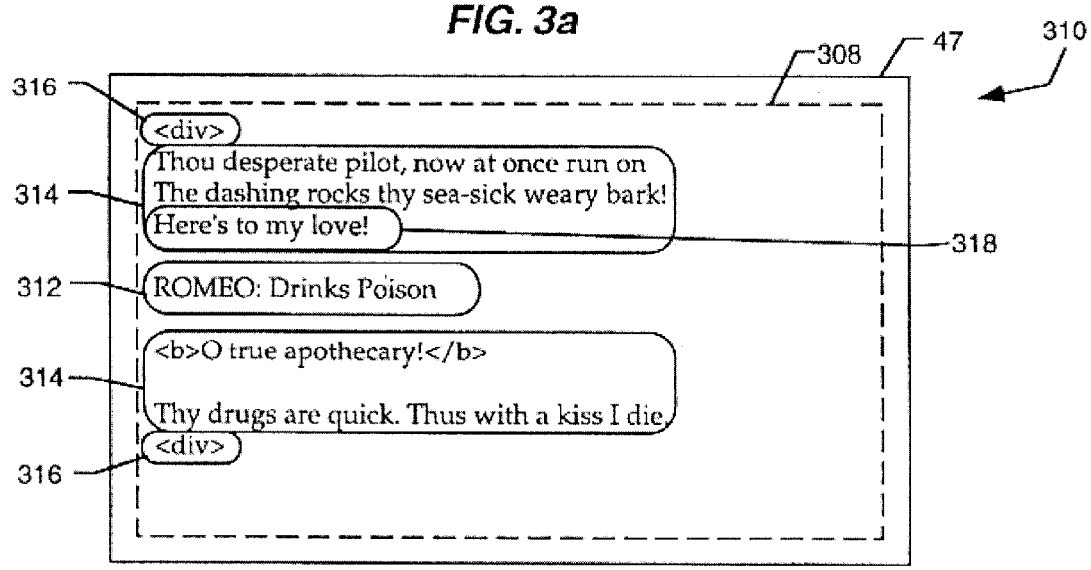
FIG. 3b is an illustration of a document view screen after a user change to the document.
Figure 4A:
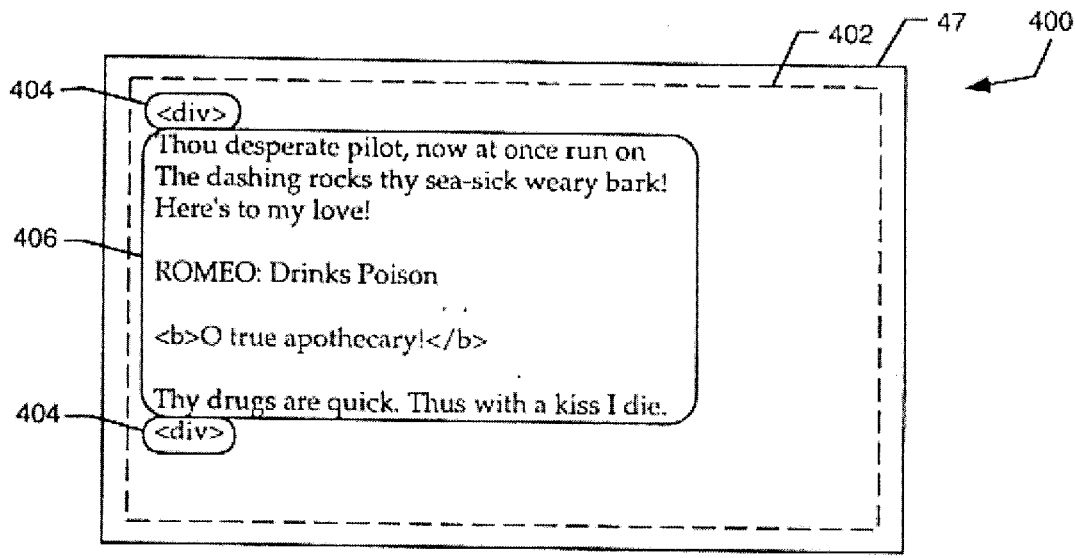
FIG. 4a is an illustration of a document screen prior to a user change to the document.
Figure 4B:
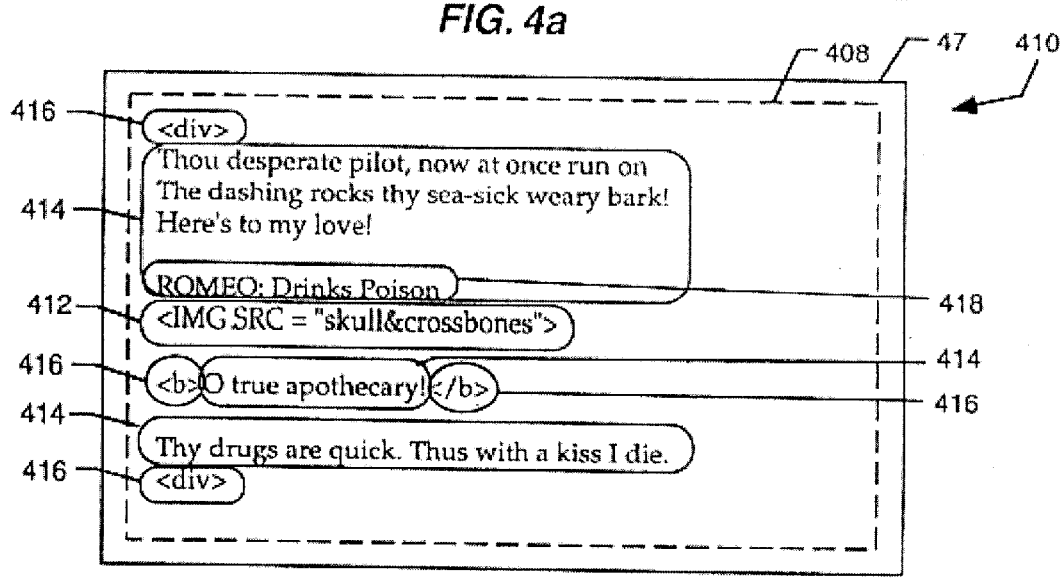
FIG. 4b is an illustration of a document view screen after a user change to the document.

FIGS. 2a, 3a, and 4a illustrate examples of display screen shots of example HTML/XML documents. FIGS. 2b, 3b, and 4b illustrate examples of the display screen shots of corresponding HTML/XML views after a user has made a change to each document shown in FIGS. 2a, 3a, and 4a. The component architecture of the tree synchronization module is described with respect to FIGS. 5 and 6, and the methods implemented by the tree synchronization module are described with respect to FIGS. 7–10.

FIGS. 2a and 2b illustrate a capability of the tree synchronization module to handle the addition of new HTML/XML fomatting commands to a document and to synchronize a document view with the document. FIG. 2a illustrates a display or monitor 47 screen shot 200 of a document 202 written in HTML/XML before a new HTML/XML formatting command has been added by a user. The user runs an application program 36 to display the document 202 on the monitor 47. The document 202 contains document text 204 and HTML/XML programming commands 206. When the user runs the application program to view the document 202, the user views the document text 204 on the monitor 47 screen.

Documents can be changed by the user through a command gesture such as a keyboard 40 input or a mouse 42 command. Any number of changes can be shown in a document view including, but not limited to, the insertion, deletion, or moving of the following Internet-usable content including, but not limited to, text, programming format codes, graphics, pictures, tables, sound, chunks or factoids, or any other object that may be contained in the document 202.

Generally, the user can add changes to the text content of the document 202 by inputting desired text through the keyboard 40 attached to the computer. An application program 36 running on the computer 20 receives the user input, and forwards the user input to the tree synchronization module 100. The tree synchronization module 100 describes, tracks, and records the user input. When a user decides to make a change to the document 202, the user's change is described in a document view. The application program 36 applies the user input to the relative locations in the document view. The application program 36 tracks the user's changes by describing the changes to the document 202 in relation to the original document 202, and recording the changes to the document 202. The tree synchronization module 100 updates the document view, and sends the update to the application program 36. The application program 36 updates the document view on the display screen or monitor 47 where the user sees the document view.

For example, if the user decides to boldface a specific section 208 of the document text 204 in FIG. 2a, the user inputs the new HTML/XML commands through the keyboard 40 around the specific text 208 to be boldfaced. Thus, as shown in the view of FIG. 2b, the user enters the new HTML/XML programming format codes 210 of "<b>" before the selected text 208 and "</b>" after the selected text 208 to be boldfaced. The application program 36 receives the user's keyboard 40 input indicating the user's additional boldface format codes. The application program 36 utilizes the tree synchronization module 100 to describe, track, and record the content and location of the user's changes in relation to the original document 202. The tree synchronization module 100 synchronizes the locations and content of the boldface commands "<b>" and "</b>" input into the document 202 in FIG. 2a with the document view 212 shown in FIG. 2b.

Thus, FIG. 2b represents an example of a display or monitor 47 screen shot 210 of a document view 212 after the user has made a change to the document 202 in FIG. 2a. The tree synchronization module 100 synchronizes the changes made to the document 202 with the document view 212. In this example, the user's keyboard 40 input of new HTML/XML programming format codes 210 appear in the document view with the original document text 212 and the original HTML/XML formatting commands 214. After the user inputs the new HTML/XML programming format codes 210 around the selected text 208, the tree synchronization module 100 inserts the user's new HTML/XML programming format commands 210 into the document view 210. In this example, no additional text has been added, but new HTML/XML programming format commands 210 have been added within the original document text 212 of the document view 212.

FIGS. 3a and 3b illustrate another capability of the tree synchronization module 100 to handle the addition of new text to a document 302 and synchronizing a document view with the document 302. In FIG. 3a, a user views the display or monitor 47 screen shot 300 of a document 302 containing HTML/XML formatting commands 304 and document text 306. If the user decides to add new text to the document 302, the user can input the new text into the document 302 through a keyboard 40, and create a document view 308 as shown in FIG. 3b. The application program 36 forwards the user input to the tree synchronization module 100 to synchronize the document 302 and the document view 308.

FIG. 3b represents an example of a display or monitor 47 screen shot 310 of a document view 308 after the user has added new text 312 to the document 302 in FIG. 3a. The original document text 314 and the original HTML/XML formatting commands 316 appear in the document view 308. After the user inputs new text 312 into the document 302, the tree synchronization module 100 inserts the user's new text 312 into the document view 308. In this example, additional text has been added within the document text 314 of the document view 308 immediately after the selected text 318.

FIGS. 4a and 4b illustrate another capability of the tree synchronization module 100 to handle the addition of an image file to a document 402 and to synchronize a document view with the document 402. In FIG. 4a, a user views the display or monitor 47 screen shot 400 of a document 402 containing HTML/XML formatting commands 404 and document text 406. If the user decides to add an image file to the document 402, the user can input the commands through a keyboard 40 instructing the computer to insert a new image file into the document 402. The user's input creates a document view 408 as shown in FIG. 4b. The application program 36 forwards the user input to the tree synchronization module 100 to synchronize the document 402 and the document view 408.

FIG. 4b represents an example of a display or monitor 47 screen shot 410 of a document view 408 after the user has added the image file commands 412 to the document 302 in FIG. 4a. The original document text 414 and the original HTML/XML formatting commands 416 appear in the document view 408. After the user inputs the new image file commands 412 into the document 402, the tree synchronization module 100 inserts the user's new image file commands 412 into the document view 408. In this example, the new image file commands 412 have been added within the document text 414 of the document view 408 immediately after the selected text 418.

Figure 5:
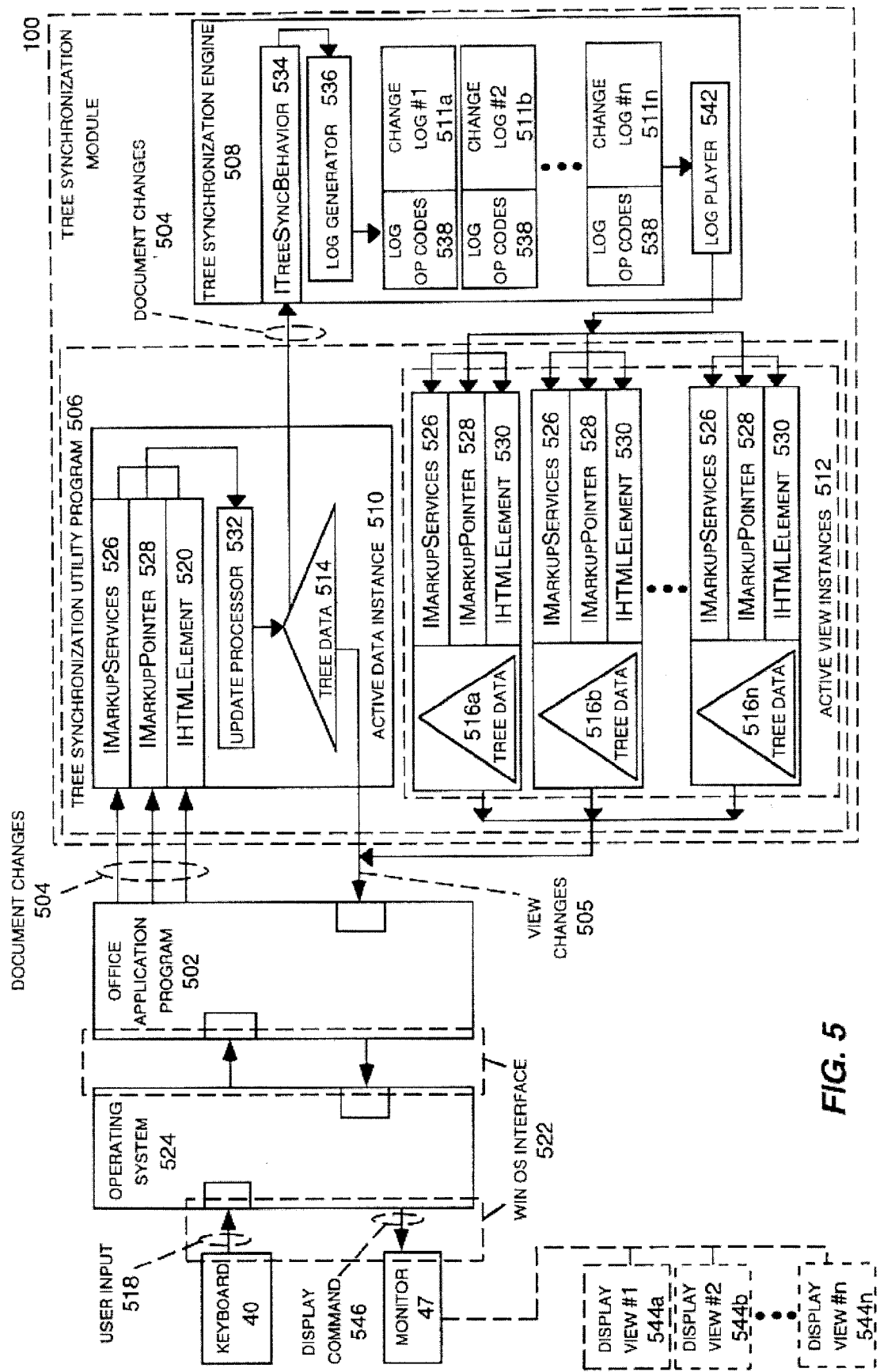
FIG. 5 is a functional block diagram illustrating the component architecture of a typical tree synchronization module.
Figure 6:
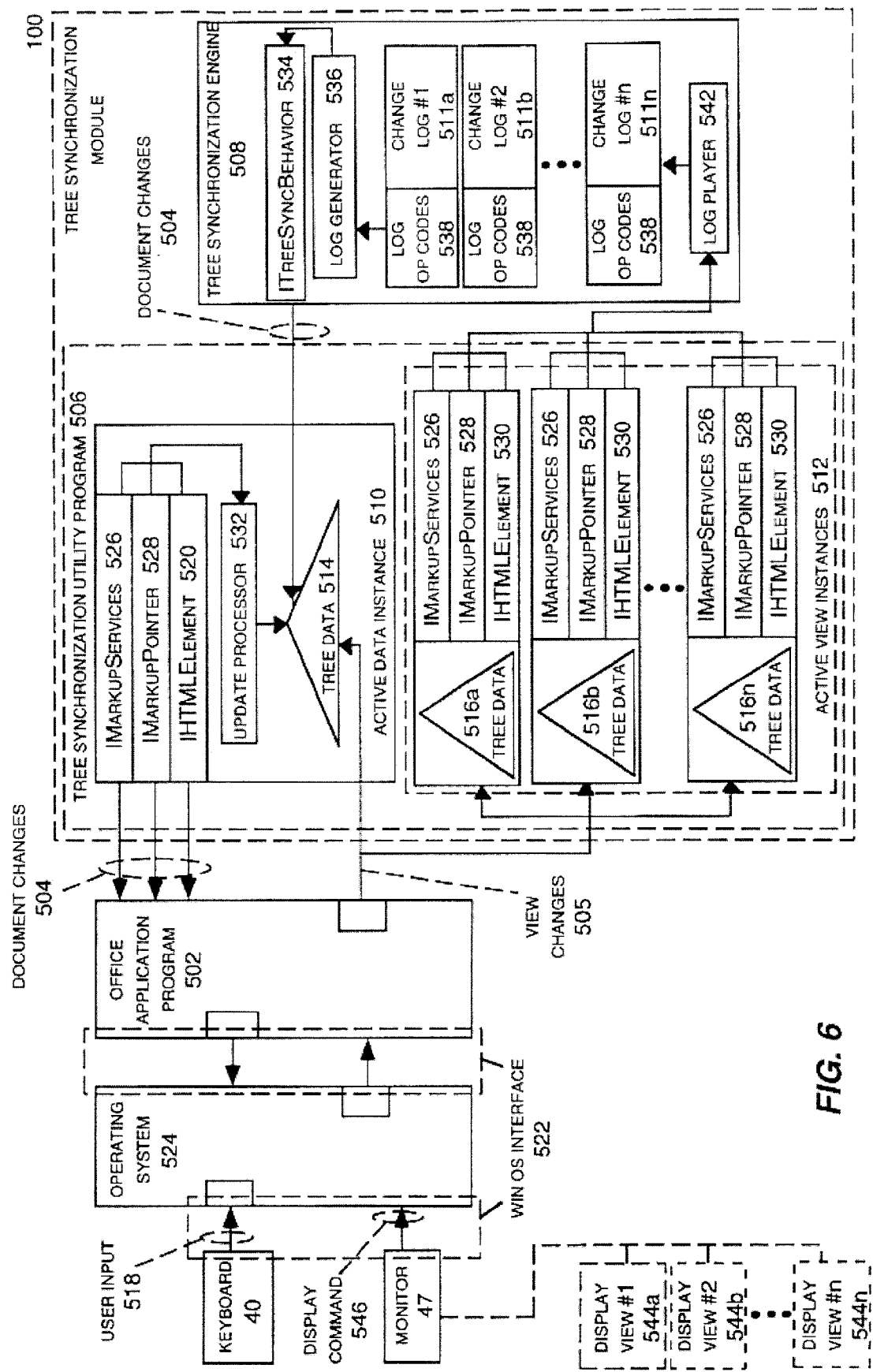
FIG. 6 is an alternative functional block diagram illustrating the component architecture of a typical tree synchronization module.

FIGS. 5 and 6 illustrate functional block diagrams of the component architecture of a typical tree synchronization module 100. FIG. 5 represents the direction of object interactions between the architectural components when the tree synchronization module 100 synchronizes a document and any document views in response to receiving a user input. The tree synchronization module 100 interacts with an office application program 502, such as Microsoft OFFICE. The office application program 502 provides the tree synchronization module 100 with Internet-viewable documents, containing text, formatting commands, image and picture files, and other Internet-viewable or usable document content. Further, the office application program 502 provides the tree synchronization module 100 with user changes to the document, called document changes 504. Once the tree synchronization module 100 synchronizes the document with its document views, the tree synchronization module 100 returns the view changes 505 to the office application program 502 for updating the display or monitor screen 47.

The tree synchronization module 100 may be configured into two components, a tree synchronization utility program 506 and a tree synchronization engine 508. The tree synchronization utility program 506 can be configured into two sub-components, the active data instance 510 and the active view instances 512. Typically, the tree synchronization utility program 506 controls the processing 502 of the document changes 504 when received from the office application program 502, and forwards the document changes 504 to the tree synchronization engine 508. Processing of the document changes 504 is performed by the active data instance 510. The active data instance 510 receives the document changes 504, updates a document data tree 514, and sends the document changes 504 to the tree synchronization engine 508 as necessary.

Typically, the tree synchronization engine 508 interacts with the active data instance 510 to receive the document changes 504, generates is change logs 511a, 511b, . . . 511n of the changes made to any respective view instances, and plays the change logs 511a, 511b, . . . 511n to each respective active view instance 512. Each active view instance 512 receives the played change log 511a, 511b, . . . 511n from the tree synchronization engine 508, applies the change log 511a, 511b, . . . 511n to the respective view data tree 516a, 516b, . . . 516n, and sends the view changes 505 to the office application program 502 as necessary.

The operation of the tree synchronization module 100 begins when a user views a document with an office application program 502 and decides to make a change to the document. The user performs a command gesture or a user input 518 at a keyboard 520 or any other input device attached to the computer 20. A standard WINDOWS operating system interface 522 or any other compatible operating system interface controls the transfer of the user input 518 from the keyboard 520 to the operating system 524. The WINDOWS operating system interface 522 also controls the transfer of the user input from the operating system 524 to the office application program 502 utilizing the tree synchronization module 502. The methods and objects to perform the interfaces between the keyboard 520 and the operating system 524, and between the operating system 524 and the office application program 502 are well-known in the art.

The office application program 502 utilizes a tree synchronization module 100 to synchronize a document with its views when a user has performed a change to the document. When the user change is received by the office application program 502, the office application program 502 sends the document change 504 to the active data instance 510 of the tree synchronization utility program 506. The active data instance 510 processes the document change 504 through one or more application program interfaces (APIs) 526, 528, 530 in the tree synchronization utility program 506. APIs are well-known in the art for permitting code-sharing between application programs and program modules. Executable routines can be stored separately as files for use by multiple application programs to share these executable routines.

Each API 526, 528, 530 calls out a previously stored set of commands to an update processor 532 in the active data instance 510 to update the document tree data 514. Typically, documents are stored in a memory device as a tree-type data structure, or tree data. The update processor 532 receives commands from the APIs 526, 528, 530 and changes the tree data 514 according to the command routines received from the APIs 526, 528, 530. For example, the active data instance 510 utilizes three APIs, ImarkupServices 526, IMarkupPointer 528, and IHTMLElement 530, to receive the document changes from the office application program 502, and to call out commands to the update processor 532 to change the tree data 514 according to the command routines contained in each API 526, 528, 530.

More specifically, the active data instance 510 calls to the IMarkupServices interface 526 to transmit instructions to the update processor 532 to insert HTML/XML tags, to remove HTML/XML tags, or to insert data content in the tree data 514 of the document. This interface 526 instructs the update processor 532 to handle document changes including changes involving HTML/XML tags or formatting commands, and changes to text or data content within or around the HTML/XML tags or formatting commands.

The active data instance 510 calls to the IMarkupPointer interface 528 to transmit instructions to the update processor 532 to remove, to copy, or to move data content in the tree data 514. This interface 528 instructs the update processor 532 to handle document changes 504 including changes to any data content, such as image or picture files, sound files, text, data or any other document content.

The active data instance 510 calls to the IHTMLElement interface 530 to transmit instructions to the update processor 532 to set or to remove attribute values for HTML/XML formatting commands. This interface 530 instructs the update processor 532 to handle document changes 504 including changes to any values for HTML/XML formatting command attributes, such as font color, font size, background color, or any other attribute having a variable value.

To track the document changes 504, the update processor 532 creates a string of characters representing the document data in their tree data 514 positions in a logical sequence. By creating a string of characters, the update processor 532 manages changes in the document data content by representing the locations of the tree data 514 in a logical, sequential structure that is portable from one view tree to another. The update processor 532 achieves a logical, sequential structure by assigning a single, unique, uni-code character position (cp) value to the document data content in the document tree data 514. The update processor 532 also assigns a single character position value for each HTML/XML tag in the document tree data 514. Thus, each alphanumeric symbol, blank position, HTML/XML tag, and any other data in the document data content is assigned a single character position (cp) value.

An example of the output string generated by the update processor 532 for a sample of HTML/XML code in a tree data 514 structure would be as follows.
The sample HTML/XML code: "<div>this<b>is</b>a test</div>"
The output string generated:

| HTML/XML code | cp value |
|---|---|
| <div> | 1 |
| t | 2 |
| h | 3 |
| i | 4 |
| s | 5 |
| <b> | 6 |
| i | 7 |
| s | 8 |
| </b> | 9 |
| a | 10 |
| (space) | 11 |
| t | 12 |
| e | 13 |
| s | 14 |
| t | 15 |
| </div> | 16 |

The update processor 532 assigns cp values for each HTML/XML tag and for each alphanumeric symbol and blank space a cp value. When applied to two document tree data structures containing the exact same HTML/XML tag and data content, the structure of the string will always generate the same structure and cp assignment. This result simplifies the mapping of character positions from one tree data structure to another.

The IMarkupPointer interface 528 also has a method that commands the update processor 532 to denote positions in the tree data 514 by using "pointers" in the tree data 514. If a user wants to position a cursor within the document and not actually change the document, a "pointer" can be inserted within the tree data 514 of the document to represent the user's designated position in the document. After a logical character string has been generated by the update processor 532, the IMarkupPointer interface 528 instructs the update processor 532 where to place any number of pointers into the string without affecting the data content or the cp values assigned to the data content.

Pointers can also be designated with features such as "left" or "right" gravity to denote the direction of preceding or following inserted objects. For example, if a range of cp's is deleted from the tree data structure, pointers can be inserted between the cp preceding the earliest deleted cp and the cp following the last deleted cp. Upon insertion of additional data content into the gap between the adjacent pointers, pointers with a "left" gravity will be positioned between the preceding cp and the first cp of the inserted data content, and pointers with "right gravity" are positioned between the last cp of the inserted data content and the first cp following the sequence. Thus, pointers existing in the view are automatically moved to the appropriate positions as changes are propagated from the document tree data 514 to the view tree data 516a, 516b, . . . 516n.

When the update processor 532 has generated character strings for the document tree data 514 and for the document changes 504, the tree synchronization utility program 502 interfaces with a tree synchronization engine 508 through the ITreeSyncBehavior interface 534, an application program interface (API). The update processor 532 sends the document changes 504 to the ITreeSyncBehavior interface 534 in the form of character strings representing the data content and the character position locations of the data content.

The ITreeSyncBehavior interface 534 handles the document changes 504 by determining the scope of the document changes 504 and identifying the location of the document changes 504 in the document tree data 514. When a view has changed, the ITreeSyncBehavior interface 534, ITreeSyncBehavior interface 534 calls out the changes for that specific view instance to a log generator 536. If multiple views have changed, the ITreeSyncBehavior interface 534 calls out the changes for the additional view instances to the log generator 536.

The log generator 536 uses "log op codes" 538 to create a change log 511a, 511b, . . . 511n or record log for each changed view. Log op codes 538 are previously stored sets of commands used to instruct the log generator 536 how to creates a change log 511a, 511b, . . . 511n or record log. These log op codes 538 include methods such as InsertText, InsertElement, DeleteElement, InsertTree, ChangeAttribute, and CutCopyMove. Depending upon the view change 505, a particular log op code 538 expresses the document changes 504 in parameters defining the view change 505. A change log 511a, 511b, . . . 511n or record log contains the view change 505 expressed as a set of parameters defined by one or more log op codes 538.

View changes 505 can be expressed in parameters such as, but not limited to, character position values, the number of data characters in the content, the attribute values, the length of the attribute values, the attribute names, the HTML tags, and the content of the change. Any pointers created by the IMarkupPointer interface 528 are converted into the character positions that they precede, and expressed as a parameter in the change log 511a, 511b, . . . 511n. For each view instance that has been affected by the document change 504, the log generator 536 generates a change log 511a, 511b, . . . 511n for that particular view instance. This procedure is called "forward logging".

For example, if a user inserts text into a document, then the log generator 536 uses log op code 538 InsertText to create a change log 511a, 511b, . . . 511n for a view. A view instance change log 511a, 511b, . . . 511n created with InsertText has at least three parameters defining the change, the character position value of the preceding data character, the number of characters to be inserted into the view, and the data content to be inserted into the view.

Other log op codes 538 can be called to define different changes to the document. InsertElement defines the content of an added HTML tag or element to the document. ChangeAttribute defines a changed HTML tag or element attribute. CutCopyMove defines the document changes when data is cut from the document, copied into memory, and moved to another part of the document.

In some cases, changed view instance parameter information defined by the log op codes 538 may not be needed to make a change in the particular view instance, but the information may be used at a later time to implement an undo command, i.e. "reverse logging". For example, if a user deletes a HTML tag from a document, then the log generator 536 uses log op code 538 DeleteElement to create a change log 511a, 511b, . . . 511n for the changed view instance. The view instance change log 511a, 511b, . . . 511n has parameters defining the change, including, but not limited to, the character position value of the beginning tag, the character position value of the ending tag, the HTML tag identification number, the number of characters in the attribute, and the content of the attribute to be inserted into the view.

The present invention supports synchronous and asynchronous updating of the active view instance 512. When a change log 511a, 511b, . . . 511n is created, the log generator 536 can store the change log 511a, 511b, . . . 511n. Instead of playing a change log 511a, 511b, . . . 511n immediately when it is first created, the tree synchronization engine 508 determines when to play the change log 511a, 511b, . . . 511n to the active view instance 512. Typically, when the tree synchronization engine 508 detects a trigger event, the tree synchronization engine 508 instructs the log player 542 to play the change logs 511a, 511b, . . . 511n to the active view instances 512. A trigger event can be any event in which a change log 511a, 511b, . . . 511n has been created in response to a document change. Trigger events can include, but are not limited to, when a change log 511a, 511b, . . . 511n has been created, when a user has made a user gesture to see a display view 544a, 544b, . . . 544n on a monitor 47 or display screen, when a command has been made to access or update a view, when processing time becomes available, or any other event during which a change log 511a, 511b, . . . 511n can be played to the active view instances 512. For example, asynchronous updates may be advantageous in circumstances when the processing unit 21 may be busy executing other system operations, thus making processing time very expensive. The trigger event would be the detection of available processing time. When available processing time is detected by the tree synchronization engine 508, the log player 542 plays the change logs 511a, 511b, . . . 511n to the active view instance 512 of the tree synchronization utility program 506.

The active view instance 512 receives any played change logs 511a, 511b, . . . 511n from the log player 542 through one or more application program (API) interfaces between the log player 542 and the view tree data 516a, 516b, . . . 516n. For example, changes to the view tree data 516a, 516b, . . . 516n are made through three previously described API interfaces, ImarkupServices 526, IMarkupPointer 528, and IHTMLElement 530. The IMarkupServices interface 526 instructs the update processor 532 to insert HTML tags, to remove HTML tags, or to insert data content in the view tree data 516a, 516b, . . . 516n. IHTMLElement interface 530 instructs the update processor 532 to set or to remove attribute values in the view tree data 516a, 516b, . . . 516n. IMarkupPointer interface 528 instructs the update processor 532 to remove, to copy, or to move data content in the view tree data 516a, 516b, . . . 516n.

After the update processor 532 applies the change logs 511a, 511b, . . . 511n to their respective view tree data 516a, 516b, . . . 516n. Then, the view changes 505 are forwarded to the office application program 502 through any commonly used interface used to receive data for the office application program 502. The office application program 502 forwards the view changes 505 to the operating system 524 through the WIN OS interface 522, and the operating system 524 sends a display command 546 to the monitor 47 or display screen. The display views 544a, 544b, . . . 544n are then updated with the view changes 505 from the tree synchronization module 502.

Referring now to FIG. 6, the disclosed component architecture is the same as in FIG. 5 except the directional arrows have been reversed. This figure illustrates how a user implements an UNDO command after a change has been made to the document. This concept involves "reverse logging", where the original document changes 504 recorded in the change logs 511a, 511b, . . . 511n are replayed by the tree synchronization module 100 to revert the changed document back to the original document.

When the user views the monitor 47 or display screen, the user may decide to implement an UNDO command. As in FIG. 5, a user input 518 at the keyboard 20 or attached input device is received by the operating system 524, forwarded to the office application program 502, and sent to the tree synchronization module 100. When the tree synchronization module 100 receives the UNDO command, the tree synchronization is module 100 instructs the tree synchronization engine 508 to replay the change logs to the tree synchronization utility program 506.

The reversal of the document changes 504 are made possible by the change logs 511a, 511b, . . . 511 n, since the change logs 511a, 511b, . . . 511n contain the original document change 504 information. The log player 542 plays the change logs 511a, 511b, . . . 511n to the update processor 532. The update processor 532 uses the change logs 511a, 511b, . . . 511n to revert the document tree data 514 back to the original tree data structure. By comparing the document change 504 character strings generated by the APIs 526, 528, 530 and the document character string generated by the update processor 532, the update processor 532 can revert the document character string back to the original document character string prior to the document changes 504.

The update processor 532 also uses the change logs 511a, 511b, . . . 511n to revert the view tree data 516a, 516b, . . . 516n back to the original view tree data structures. By comparing the document change 504 character strings generated by the APIs 526, 528, 530 and the view tree data 516a, 516b, . . . 516n character strings generated by the update processor 532, the update processor 532 can revert the view tree data 516a, 516b, . . . 516n character string back to the original view tree data 516a, 516b, . . . 516n character string prior to the view changes 505.

When the update processor 532 has reverted the view tree data and the document tree data to their original forms, the tree synchronization module 100 updates the display views 544a, 544b, . . . 544n as described previously in FIG. 5. The view changes 505 are forwarded by the tree synchronization module 100 to the office application program 502 through a previously described standard interface used to receive data for the office application program 502. The office application program 502 forwards the view changes 505 to the operating system 524 through the WIN OS interface 522, and the operating system 524 sends a display command 546 to the monitor 47 or display screen. The display views 544a, 544b, . . . 544n are then updated with the view changes 505 from the tree synchronization module 100.

Tree Synchronization Module Routines

Figure 7:
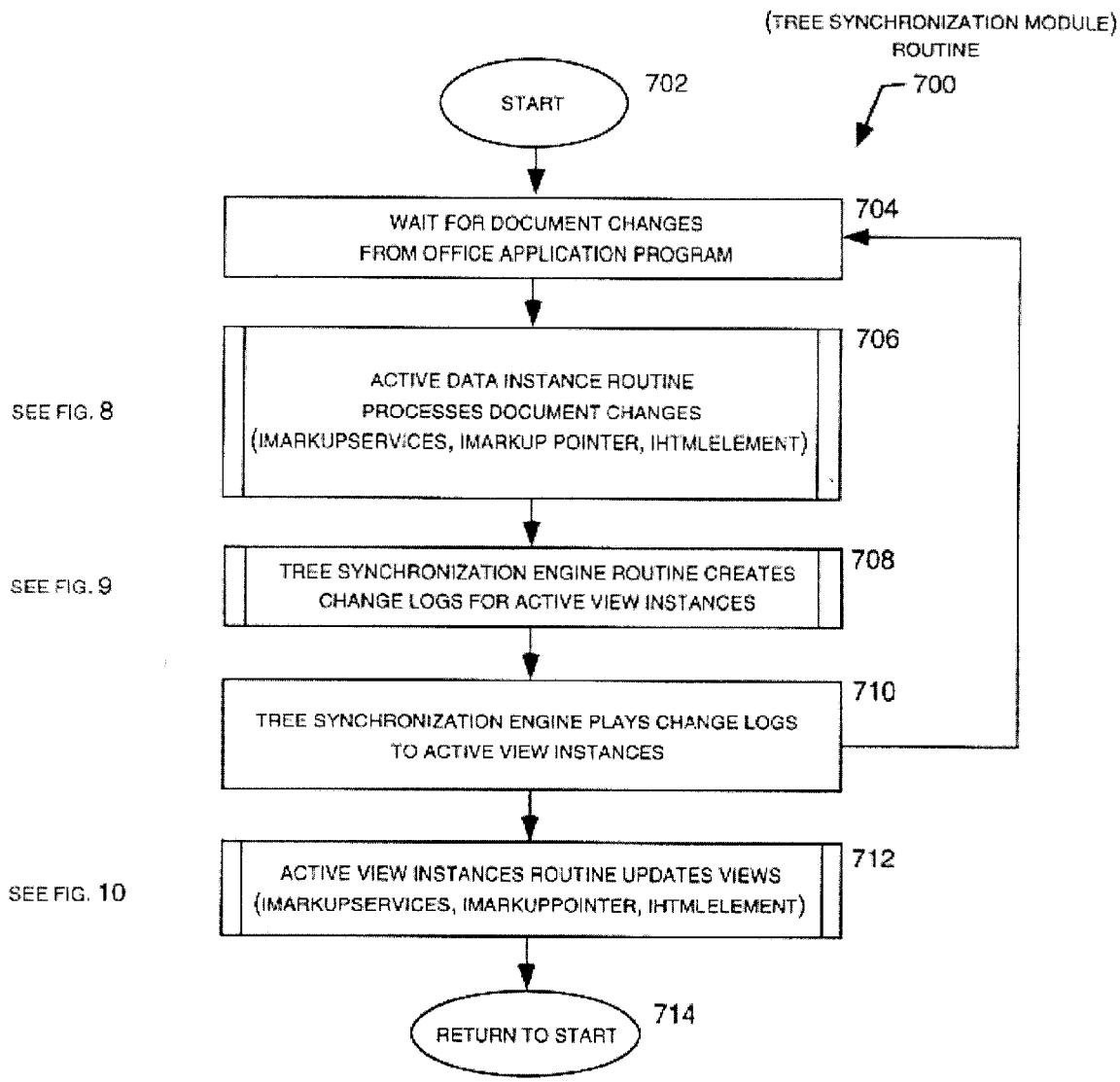
FIG. 7 is a logic flow diagram illustrating the steps performed by a computer system utilizing a tree synchronization module routine.

FIG. 7 is a logic flow diagram illustrating a computer algorithm for synchronizing a document and its views. The steps illustrated in FIG. 7 are performed by a tree synchronization module 100 operating with the office application program 502. Step 702 starts the routine 700 performed by the tree synchronization module 100.

Step 702 is followed by step 704, in which the tree synchronization module 100 waits for document changes 504 from the office application program 502. When a document change 504 is received by the tree synchronization module 502, step 704 is followed by routine 706, in which the active data instance 510 describes the document changes 504. Routine 706 is further described in FIG. 8.

The active data instance 510 returns to routine 708, in which the tree synchronization engine 508 receives the document changes 504 from the active data instance 510 and creates change logs 511a, 511b, . . . 511n for the active view instances 512. Routine 708 is further described in FIG. 9.

The tree synchronization engine 508 returns to step 710, in which the tree synchronization engine 508 plays the change logs 511a, 511b, . . . 511n to the active view instances 512. Step 710 is followed by routine 712, in which the active view instances 512 update the view tree data 516a, 516b, . . . 516n. Routine 712 is further described in FIG. 10.

Figure 8:
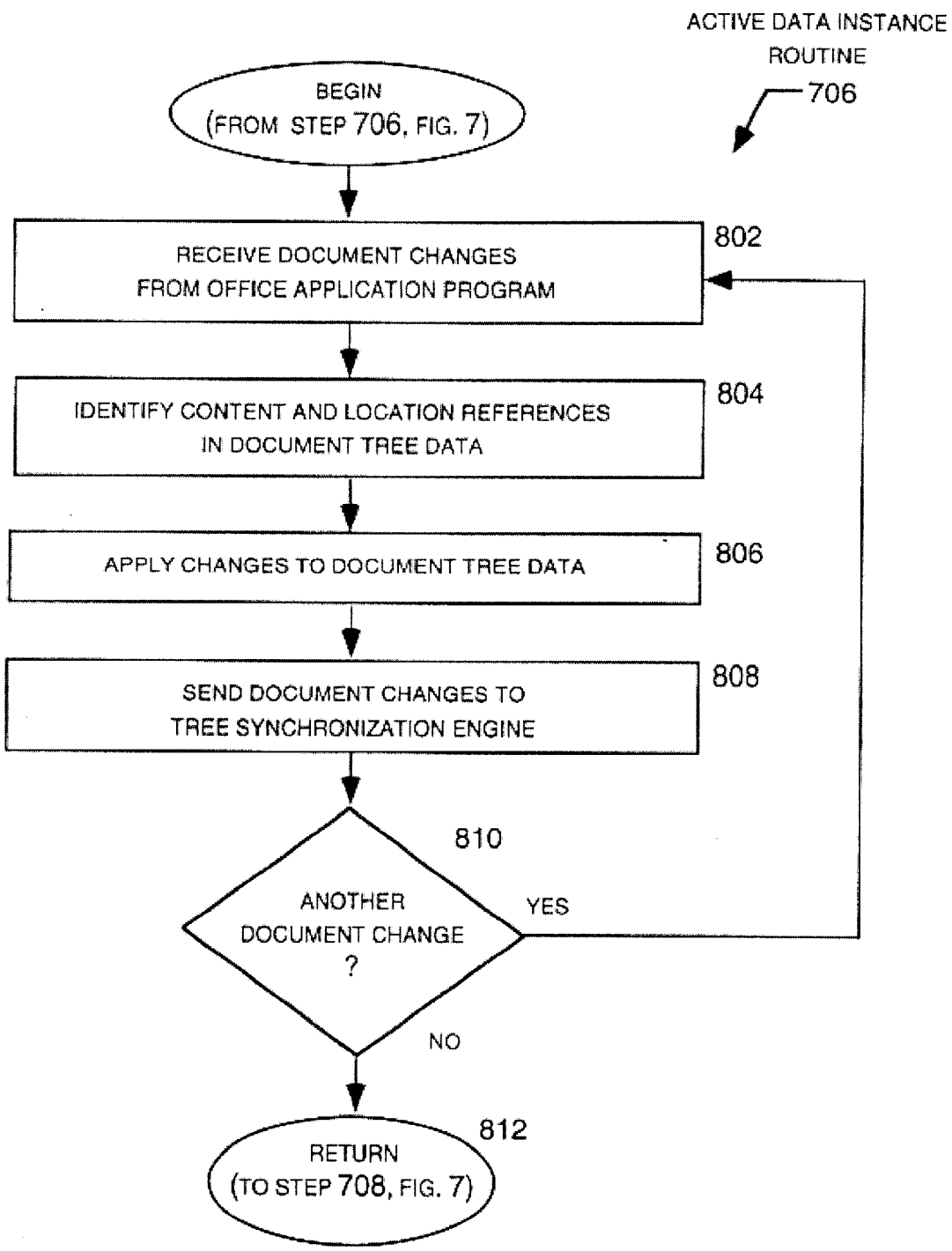
FIG. 8 is a logic flow diagram illustrating the steps performed by a typical active data instance.

FIG. 8 illustrates the routine 706 which is performed by the active data instance 510 to describe the document changes. FIG. 8 is a logic flow diagram illustrating routine 706, which begins following step 704 in FIG. 7. In step 802, the active data instance 510 receives document changes from the office application program 502.

Step 802 is followed by step 804, in which the active data instance 510 identifies the content and location references in the document tree data 514. The active data instance 510 includes one or more application program interfaces (APIs) 526, 528, 530 that receive the document changes 504 from the office application program 502. For example, as previously described above in FIG. 5, the APIs ImarkupServices 526, IMarkupPointer 528, and IHTMLElement 530 call out specific sets of instructions to instruct the update processor 532 how to describe the content and location references in the document tree data 514. The update processor 532 uses the APIs 526, 528, 530 to create a string of characters representing the document tree data 514 in a logical, sequential structure. Each document data character is assigned a single, unique, uni-code character position (cp) value. The representation of the document in this manner permits the resultant character string to be compared with the document changes 504.

Step 804 is followed by step 806, in which the active data instance 510 applies the document change 504 to the document tree data 514. The update processor 532 compares the document changes 504 to the document tree data 514, and changes the document tree data 514 by inserting and/or deleting data content in the document tree data 514.

After step 806, step 808 sends the document changes 504 to the tree synchronization engine 508. When the update processor 532 completes the document changes 504 to the document tree data 514, the update processor 532 forwards the document changes 504 to the tree synchronization engine 508 to create one or more change logs 511a, 511b, . . . 511n describing the view changes.

Step 808 is followed by decision block 810, in which the update processor 532 checks for another document change 504. If another document change 504 is detected, then the "YES" branch is followed to step 804, in which the active data instance 510 identifies the new document content and location references in the document tree data 514. If no further document changes are detected, then the "NO" branch is followed to the return step 812, which returns to step 708 in FIG. 7.

Figure 9:
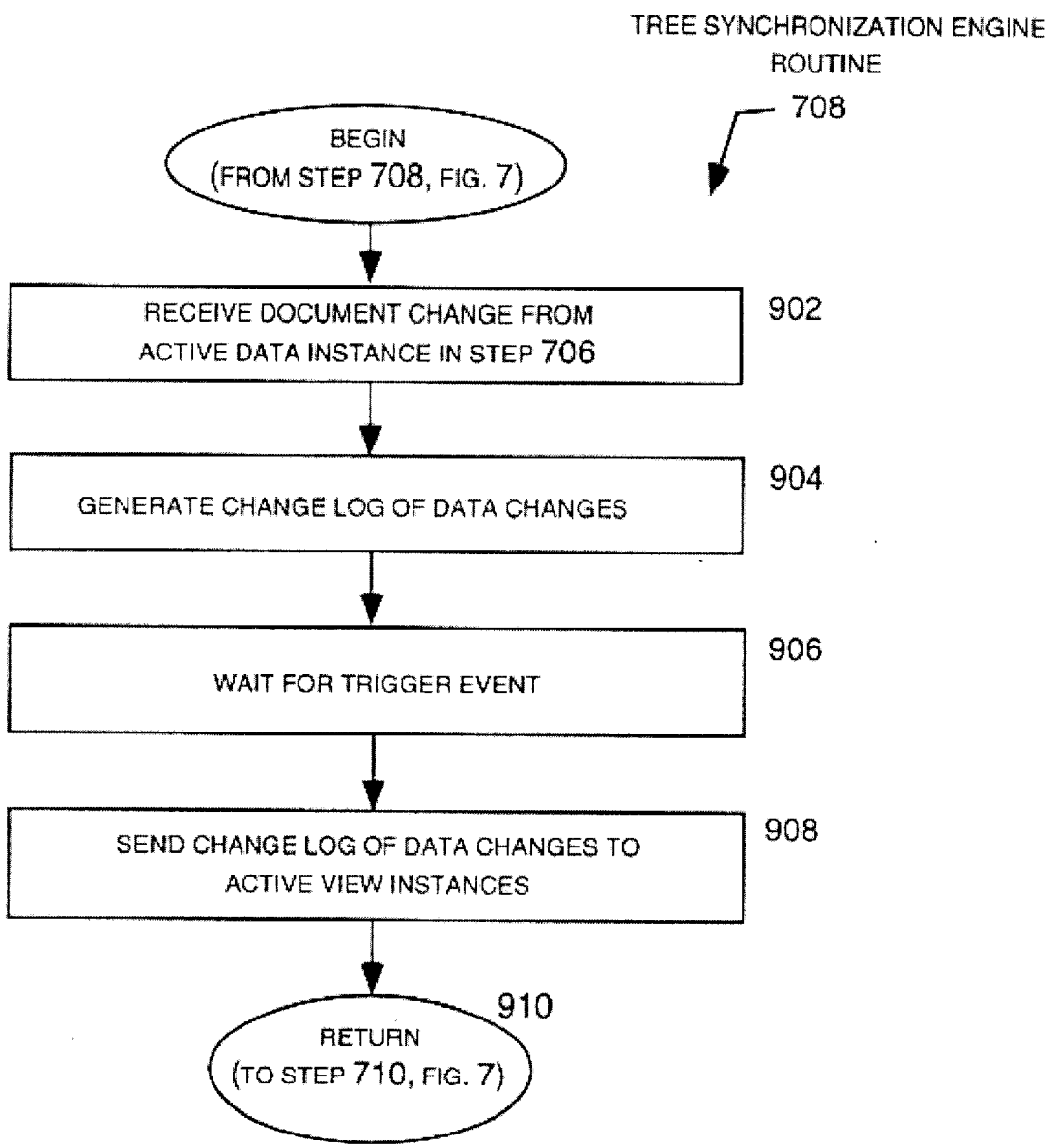
FIG. 9 is a logic flow diagram illustrating the steps performed by a typical tree synchronization engine.

FIG. 9 illustrates the routine 708 in which the tree synchronization engine 508 creates change logs 511a, 511b, . . . 511n for the active view instances 512. FIG. 9 is a logic flow diagram illustrating routine 708, which begins following routine 706 in FIG. 7. In step 902, the tree synchronization engine 508 receives the document changes 504 from the active data instance 510 in routine 706. The tree synchronization engine 508 includes one or more application program interfaces (APIs) 534 that receive the document changes 504 from the active data instance 510. For example, as previously described above in FIG. 5, the API ITreeSyncBehavior 534 calls out a specific set of instructions to instruct the tree synchronization engine 508 how to determine the scope of the document changes 504 and how to identify the location of the document changes 504 in the document tree data 514. The log generator 536 uses the API ITreeSyncBehavior 534 to determine any view changes 505 corresponding to the document change.

Step 902 is followed by step 904, in which the log generator 536 generates change logs 511a, 511b, . . . 511n for the view changes 505. Log op codes 538, as previously described above in FIG. 5, are used by the log generator 536 to generate a change log 511a, 511b, . . . 511n for each view change 505.

Step 904 is followed by step 906, in which the tree synchronization engine 508 waits for a trigger event to occur before playing the change logs to the active view instances 512 of the tree synchronization utility 512. A trigger event can include events such as, but are not limited to, when a change log 511a, 511b, . . . 511n becomes available for playing, when a display view 544a, 544b, . . . 544n is called upon by a user gesture or command, when processing time becomes available, when the view is called upon to be sent over the Internet, or any other event when a view is sought by an application program or a user.

Step 906 is followed by step 908, in which the log player 542 of the tree synchronization engine 508 plays the change logs 511a, 511b, . . . 511n containing the view changes 505 to the active view instances 512 of the tree synchronization utility 506. In response to a trigger event occurring, the tree synchronization utility 506 instructs the log player 542 to play the change logs 511a, 511b, . . . 511n to the active view instances 512. Step 908 is followed by return step 910, returning to step 710 in FIG. 7.

Figure 10:
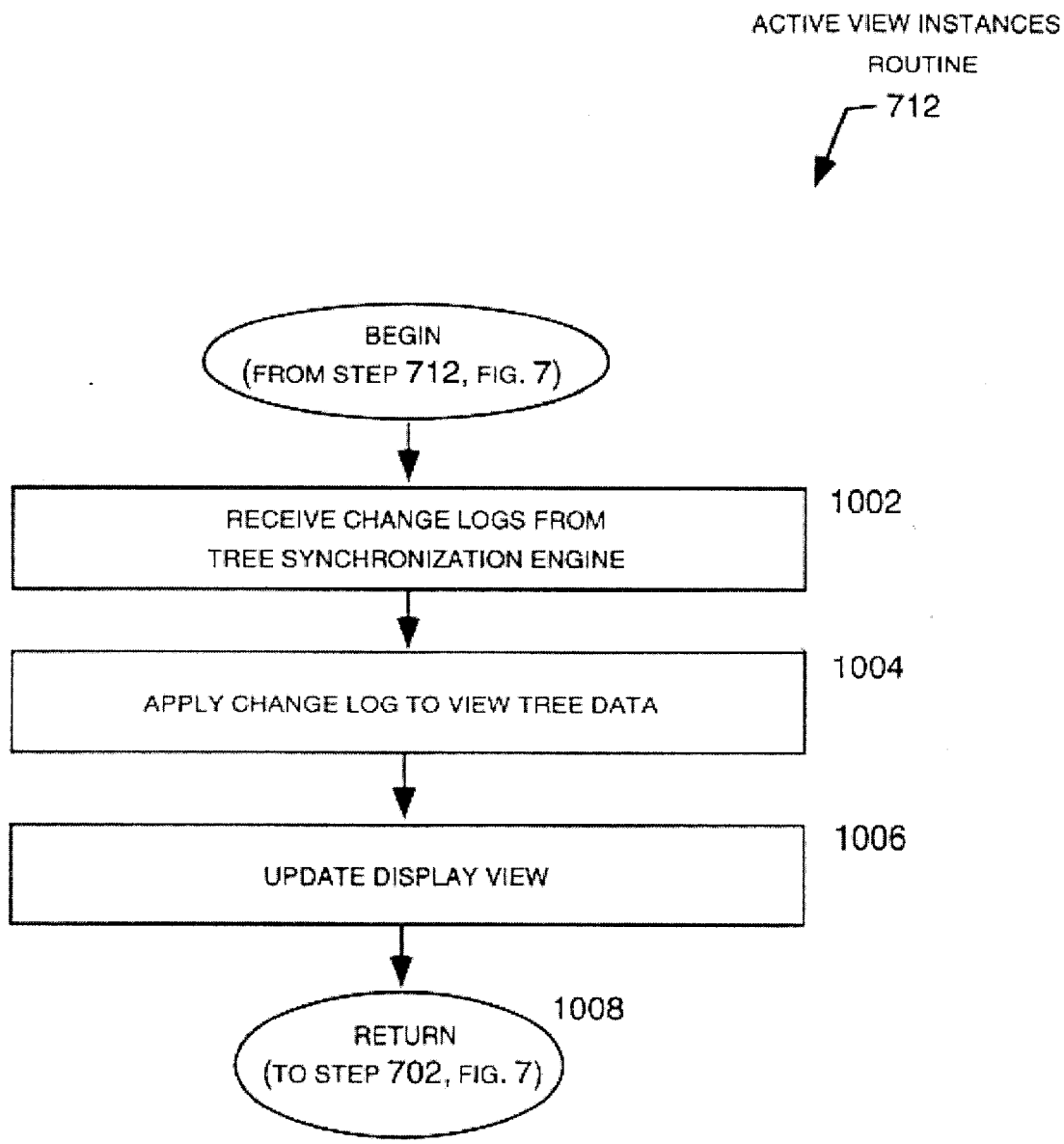
FIG. 10 is a logic flow diagram illustrating the steps performed by a typical active view instance.

FIG. 10 illustrates the routine 712 in which the active view instances 512 update the view tree data 516a, 516b, . . . 516n and the view changes 505 are sent to the office application program 502. FIG. 10 is a logic flow diagram illustrating routine 712, which begins following step 710 in FIG. 7. In step 1002, the active view instances 512 receive the change logs 511a, 511b, . . . 511n from the log player 542 in the tree synchronization engine 508 in routine 706. The active view instances 512 include one or more application program interfaces (APIs) 526, 528, 530 that receive the change logs 540a, 540b, . . . 540n from the log player 542 of the tree synchronization engine 508. The APIs ImarkupServices 526, IMarkupPointer 528, and IHTMLElement 530 receive the change logs 511a, 511b, . . . 511n and apply the view changes 505 to the view tree data 516a, 516b, . . . 516n.

As previously described above in FIG. 5, the APIs 526, 528, 530 contain stored sets of instructions instructing the active view instances 512 how to apply the change logs 511a, 511b, . . . 511n to the view tree data 516a, 516b, . . . 516n. Step 1002 is followed by step 1004, in which the active view instances 512 apply the change logs 511a, 511b, . . . 511n to the view tree data 516a, 516b, . . . 516n. For example, if the change log 511a, 511b, . . . 511n contains HTML tags and data content, then the IMarkupServices interface 526 instructs the active view instances 512 how to insert HTML tags, to remove HTML tags, or to insert data content in the view tree data 516a, 516b, . . . 516n. For attribute value changes, the IHTMLElement interface 528 instructs the active view instances 512 to set or to remove attribute values in the view tree data 516a, 516b, . . . 516n. For cut, copy, and move operations involving data content, the IMarkupPointer interface 530 instructs the active view instances 512 to remove, to copy, or to move data content in the view tree data 516a, 516b, . . . 516n. Thus, the active view instances 512 utilize the stored instruction sets of the APIs 526, 5218, 530 to update the view tree data 516a, 516b, . . . 516n.

Step 1004 is followed by step 1006, in which the active view instances 512 update the display views 544a, 544b, . . . 544n. After the change logs 511a, 511b, . . . 511n have been applied to the view tree data 516a, 516b, . . . 516n, the tree synchronization utility program 506 sends the view changes 505 to the office application program 502. A standard interface contained within the office application program 502 receives the view changes 505, and the office application program 502 sends a command with the view changes 505 to the operating system 524 through the previously described WIN OS interface 522. The operating system 524 sends a display command 546 with the view changes 505 to a display screen or monitor 47 through the WIN OS interface 522, and the display views 544a, 544b, . . . 544n are updated for viewing by the user.

Step 1006 is followed by step 1008, in which the routine 712 returns to step 702 in FIG. 7 to start the tree synchronization module routine 700 again.

In view of the foregoing, it will be appreciated that the invention provides a routine for synchronizing a view or multiple views with a document when changes are made to the document. It will be understood that the preferred embodiment has been disclosed by way of example, and that other modifications may occur to those skilled in the art without departing from the scope and spirit of the appended claims.

The invention claimed is:

1. A method comprising:

using a first application to render a first view of a document;

using a second application to render a second view of the document;

receiving through the first application, a user-submitted modification to the first view of the document;

performing a modification to a first data structure associated with the first view of the document, the modification being based on the user-submitted modification;

generating a change log that represents the modification to the first data structure;

applying the change log to a second data structure, the second data structure being associated with the second view of the document such that the second data structure is modified like the first data structure was modified; and refreshing the second view of the document so that the second view of the document is a visual representation of the modified second data structure.

2. The method as recited in claim 1, wherein the generating a change log comprises:

recording a content of the modification; and recording a unique, logical location of the modification within the first data structure.

3. The method as recited in claim 1, wherein the generating a change log comprises:

generating a string of characters representing data associated with the document and unique, logical positions within the first data structure;

determining a scope of changes made to the string of characters;

determining a root character in the string of characters; and generating a change log containing document changes beginning with the root character.

4. The method as recited in claim 3, further comprising generating multiple change logs based on the root character in the string of characters.

5. The method as recited in claim 3, wherein the generating a string of characters comprises identifying individual specific logical positions in the first data structure with a numeric integer.

6. The method as recited in claim 1 wherein the applying the change log to a second data structure comprises:

detecting a trigger event; and in response to detecting the trigger event, playing the change log.

7. The method as recited in claim 6, wherein the trigger event comprises detection of available processing time of a processing unit.

8. The method as recited in claim 6, wherein the trigger event comprises detection of a user-submitted request to render the second view of the particular document.

9. The method as recited in claim 6, wherein the trigger event comprises detection of a request to refresh the second view of the particular document.

10. The method as recited in claim 1 wherein the second data structure is modified in the same way the that the first data structure was modified.

11. The method as recited in claim 1 wherein the first and second data structures are tree data structures.

12. The method as recited in claim 1 wherein the document comprises an XML document.

13. The method as recited in claim 1 wherein the document comprises an HTML document.

14. The method as recited in claim 1 wherein the first application comprises a word processing application.

15. The method as recited in claim 1 wherein the first application comprises a document editing application.

16. The method as recited in claim 1 wherein the second application comprises an Internet browser application.

17. The method as recited in claim 1 wherein the second application comprises a second instance of the first application.

18. The method as recited in claim 1 wherein:

the first application comprises a document editing application; and the second application comprises a document rendering application.

19. The method as recited in claim 1 wherein the user-submitted modification comprises an addition of formatting data.

20. The method as recited in claim 1 wherein the user-submitted modification comprises a modification of formatting data.

21. The method as recited in claim 1 wherein the user-submitted modification comprises an addition of textual data.

22. The method as recited in claim 1 wherein the user-submitted modification comprises a modification of textual data.

23. One or more computer-readable media comprising computer executable instructions that, when executed, direct a computing system to perform the method as recited in claim 1.

24. A system comprising:

a first application program configured to:
- generate a first view of a document; and
- receive a data modification associated with the first view of the document;

a second application program configured to generate a second view of the document; and a tree synchronization utility configured to:
- receive the data modification from the first application program;
- generate a string of characters representing data associated with the document as stored in a first data structure associated with the first view of the document;
- generate change information representing the data modification;
- update the first data structure based on the change information;
- generate a change log for the second view of the document based on the change information and the string of characters;
- update a second data structure associated with the second view of the document; and
- refresh the second view of the document to reflect the update to the second data structure.

25. The system as recited in claim 24 wherein the second application comprises a second instantiation of the first application.

26. The system as recited in claim 24 wherein:
- the first application comprises a document editing application; and
- the second application comprises a document rendering application.

27. One or more computer-readable media comprising computer executable instructions that, when executed, direct a computing system to:
- render a first view of a document using a first application program, the first view of the document being an editable representation of a first instance of a tree data structure associated with the document;
- render a second view of the document using a second application program, the second view of the document being a representation of a second instance of the tree data structure associated with the document;
- receiving an edit to the first view of the document;
- modifying the first instance of the tree data structure based on the edit to the first view of the document;
- generating a change log based on the edit to the first instance of the tree data structure:
- using the change log to modify the second instance of the tree data structure; and
- refreshing the second view of the document such that the second view of the document comprises a representation of the second instance of the tree data structure after the second instance of the tree data structure is modified.

* * * * *